(12) United States Patent
MacKenzie et al.

(10) Patent No.: US 12,323,901 B2
(45) Date of Patent: Jun. 3, 2025

(54) CELLULAR TELECOMMUNICATIONS NETWORK

(71) Applicant: BRITISH TELECOMMUNICATIONS PUBLIC LIMITED COMPANY, London (GB)

(72) Inventors: Richard MacKenzie, London (GB); Douglas Fripp, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 18/570,170

(22) PCT Filed: Jun. 10, 2022

(86) PCT No.: PCT/EP2022/065836
§ 371 (c)(1),
(2) Date: Dec. 14, 2023

(87) PCT Pub. No.: WO2022/263318
PCT Pub. Date: Dec. 22, 2022

(65) Prior Publication Data
US 2024/0276351 A1 Aug. 15, 2024

(30) Foreign Application Priority Data
Jun. 17, 2021 (GB) ........................ 2108635

(51) Int. Cl.
*H04W 48/08* (2009.01)
(52) U.S. Cl.
CPC .................... *H04W 48/08* (2013.01)
(58) Field of Classification Search
CPC .............. H04W 68/005; Y02D 30/70
(Continued)

(56) References Cited

U.S. PATENT DOCUMENTS 6,775,780 B1 8/2004 Muttik
7,444,309 B2 10/2008 Branke et al.
(Continued)

FOREIGN PATENT DOCUMENTS

CN 102083145 A 6/2011
CN 102149101 A 8/2011
(Continued)

OTHER PUBLICATIONS

"3rd Generation Partnership Project Technical Specification Group Core Network and Terminals; Non-Access-Stratum (NAS) protocol for Evolved Packet System (EPS); Stage 3 (Release 16)" 3GPP TS 24.301 V16.8.0 (Mar. 2021), 2021, 586 pages.
(Continued)

*Primary Examiner* — Fabricio R Murillo Garcia
(74) *Attorney, Agent, or Firm* — EIP US LLP

(57) ABSTRACT

This disclosure provides a method of operating a management node in a cellular telecommunications network, the cellular telecommunications network including a first base station and a User Equipment (UE), the management node storing a first set of tracking area codes, wherein the first base station is configured to transmit a first tracking area code and the UE is configured to send a tracking area update request message to the first base station identifying the first tracking area code, the method including receiving a request message from the first base station, the request including the first tracking area code identified in the tracking area update request message; comparing the received first tracking area code to the first set of tracking area codes; and sending a response message to the first base station, the response message accepting or rejecting the tracking area request based on the comparison.

5 Claims, 9 Drawing Sheets

(58) Field of Classification Search
USPC .................................................... 455/422.1
See application file for complete search history.

(56) References Cited

U.S. PATENT DOCUMENTS

| | | | |
|---|---|---|---|
| 7,656,799 B2 | 2/2010 | Samuels et al. | |
| 8,903,402 B2 | 12/2014 | Guo et al. | |
| 9,141,796 B2 | 9/2015 | Kim et al. | |
| 9,215,629 B2 | 12/2015 | Hapsari et al. | |
| 9,301,105 B2 | 3/2016 | Kim et al. | |
| 9,392,420 B2 | 7/2016 | Fodor et al. | |
| 9,439,137 B2 | 9/2016 | Kim et al. | |
| 9,462,546 B2 | 10/2016 | Ohta et al. | |
| 9,615,318 B2 | 4/2017 | Morper et al. | |
| 9,621,571 B2 | 4/2017 | Kim et al. | |
| 9,659,176 B1 | 5/2017 | Roter et al. | |
| 9,961,687 B2 | 5/2018 | Kashiwase et al. | |
| 9,998,982 B2 | 6/2018 | Horn et al. | |
| 10,057,743 B2 | 8/2018 | Jabara et al. | |
| 10,104,110 B2 | 10/2018 | Oliphant et al. | |
| 10,405,280 B2 | 9/2019 | Mackenzie et al. | |
| 10,462,846 B2 | 10/2019 | Morrill et al. | |
| 10,498,502 B2 | 12/2019 | Mildh et al. | |
| 11,470,548 B2 | 10/2022 | MacKenzie | |
| 2007/0300298 A1 | 12/2007 | Goranson et al. | |
| 2008/0102896 A1* | 5/2008 | Wang | H04W 60/04 |
| | | | 455/560 |
| 2009/0219888 A1 | 9/2009 | Chen et al. | |
| 2010/0120447 A1 | 5/2010 | Anderson et al. | |
| 2010/0157911 A1 | 6/2010 | Hegde et al. | |
| 2010/0178912 A1 | 7/2010 | Gunnarsson et al. | |
| 2010/0227623 A1 | 9/2010 | De Pasquale et al. | |
| 2011/0190027 A1 | 8/2011 | Michel et al. | |
| 2011/0274030 A1 | 11/2011 | Wang et al. | |
| 2012/0002537 A1 | 1/2012 | Bao et al. | |
| 2012/0026865 A1 | 2/2012 | Fan et al. | |
| 2012/0108245 A1 | 5/2012 | Zhang et al. | |
| 2012/0157095 A1 | 6/2012 | Fodor et al. | |
| 2012/0236828 A1 | 9/2012 | Hapsari et al. | |
| 2012/0244869 A1 | 9/2012 | Song et al. | |
| 2012/0257495 A1 | 10/2012 | Schwarz et al. | |
| 2012/0264418 A1 | 10/2012 | Lee et al. | |
| 2012/0275315 A1 | 11/2012 | Schlangen et al. | |
| 2013/0005340 A1 | 1/2013 | Drazynski et al. | |
| 2013/0035033 A1 | 2/2013 | Sanneck et al. | |
| 2013/0084873 A1 | 4/2013 | Sharony et al. | |
| 2013/0095842 A1 | 4/2013 | Jia et al. | |
| 2013/0130670 A1 | 5/2013 | Samdanis et al. | |
| 2013/0150044 A1 | 6/2013 | Zhang et al. | |
| 2013/0170435 A1 | 7/2013 | Dinan | |
| 2013/0242720 A1 | 9/2013 | Chou | |
| 2013/0252622 A1 | 9/2013 | Kobayashi | |
| 2013/0260768 A1 | 10/2013 | Guo et al. | |
| 2014/0018057 A1 | 1/2014 | Yu et al. | |
| 2014/0038593 A1 | 2/2014 | Kim et al. | |
| 2014/0050135 A1 | 2/2014 | Zhang et al. | |
| 2014/0051437 A1 | 2/2014 | Diachina et al. | |
| 2014/0187234 A1 | 2/2014 | Diachina | |
| 2014/0071891 A1 | 3/2014 | Zhou et al. | |
| 2014/0071943 A1 | 3/2014 | Lee et al. | |
| 2014/0092765 A1 | 4/2014 | Agarwal et al. | |
| 2014/0123280 A1 | 5/2014 | Kedma et al. | |
| 2014/0126562 A1 | 5/2014 | Gunnarsson et al. | |
| 2014/0187236 A1 | 7/2014 | Chiang et al. | |
| 2014/0269547 A1 | 9/2014 | Valliappan et al. | |
| 2014/0286218 A1 | 9/2014 | Park et al. | |
| 2014/0364114 A1 | 12/2014 | Zhao | |
| 2015/0063136 A1 | 3/2015 | Shen et al. | |
| 2015/0092552 A1 | 4/2015 | Bajj et al. | |
| 2015/0131524 A1 | 5/2015 | Cavalcante et al. | |
| 2015/0140955 A1 | 5/2015 | Chakraborty et al. | |
| 2015/0271714 A1 | 9/2015 | Shetigar et al. | |
| 2015/0281974 A1 | 10/2015 | Ghasemzadeh et al. | |
| 2015/0312769 A1 | 10/2015 | Shindo | |
| 2015/0358892 A1 | 12/2015 | Pandey et al. | |
| 2015/0358940 A1 | 12/2015 | Zhang et al. | |
| 2016/0014661 A1 | 1/2016 | Choi et al. | |
| 2016/0057159 A1 | 2/2016 | Yin et al. | |
| 2016/0057699 A1 | 2/2016 | Jang | |
| 2016/0088493 A1 | 3/2016 | Byun et al. | |
| 2016/0100451 A1 | 4/2016 | Wass et al. | |
| 2016/0150420 A1 | 5/2016 | Byun et al. | |
| 2016/0174149 A1 | 6/2016 | Byun et al. | |
| 2016/0192177 A1 | 6/2016 | Kim et al. | |
| 2016/0219504 A1* | 7/2016 | Cho | H04W 52/242 |
| 2016/0255529 A1 | 9/2016 | Zhang et al. | |
| 2016/0295357 A1 | 10/2016 | Grayson et al. | |
| 2016/0323931 A1 | 11/2016 | Huang et al. | |
| 2017/0041098 A1 | 2/2017 | Saghir et al. | |
| 2017/0055186 A1 | 2/2017 | Donepudi et al. | |
| 2017/0055193 A1 | 2/2017 | Mueck et al. | |
| 2017/0064557 A1 | 3/2017 | Alsohail et al. | |
| 2017/0083703 A1 | 3/2017 | Abbasi et al. | |
| 2017/0086181 A1 | 3/2017 | Briggs | |
| 2017/0171256 A1* | 6/2017 | Liang | H04W 8/18 |
| 2017/0187607 A1 | 6/2017 | Shaikh et al. | |
| 2017/0289904 A1 | 10/2017 | Li | |
| 2017/0303188 A1 | 10/2017 | Fitch et al. | |
| 2017/0311255 A1 | 10/2017 | Hessler et al. | |
| 2017/0318526 A1 | 11/2017 | Wang et al. | |
| 2018/0027582 A1 | 1/2018 | Yerramalli et al. | |
| 2018/0049098 A1 | 2/2018 | Ueda | |
| 2018/0054840 A1 | 2/2018 | Fitch et al. | |
| 2018/0097826 A1 | 4/2018 | Luan et al. | |
| 2018/0146475 A1 | 5/2018 | Mitsui et al. | |
| 2018/0152469 A1 | 5/2018 | Smith et al. | |
| 2018/0262922 A1 | 9/2018 | Mackenzie et al. | |
| 2018/0357413 A1 | 12/2018 | Rivera | |
| 2018/0376327 A1 | 12/2018 | Sivavakeesar | |
| 2019/0043350 A1 | 2/2019 | Rosales et al. | |
| 2019/0098582 A1 | 3/2019 | Mackenzie et al. | |
| 2019/0121978 A1 | 4/2019 | Kraemer et al. | |
| 2019/0159048 A1 | 5/2019 | Feldkamp | |
| 2019/0313329 A1 | 10/2019 | MacKenzie et al. | |
| 2019/0394704 A1 | 12/2019 | Lou et al. | |
| 2019/0394706 A1 | 12/2019 | Phan et al. | |
| 2020/0026854 A1 | 1/2020 | Guo et al. | |
| 2020/0037285 A1* | 1/2020 | Sivavakeesar | H04W 76/19 |
| 2020/0154332 A1 | 5/2020 | Tsuda et al. | |
| 2020/0159917 A1 | 5/2020 | Cervantez | |
| 2020/0244547 A1* | 7/2020 | Uppili | H04L 41/5067 |

FOREIGN PATENT DOCUMENTS

| | | |
|---|---|---|
| CN | 102612842 A | 7/2012 |
| CN | 102695251 A | 9/2012 |
| CN | 102695253 A | 9/2012 |
| CN | 103024880 A | 4/2013 |
| CN | 103249111 A | 8/2013 |
| CN | 103906203 A | 7/2014 |
| CN | 104113897 A | 10/2014 |
| CN | 104469830 A | 3/2015 |
| CN | 104885494 A | 9/2015 |
| CN | 104969625 A | 10/2015 |
| CN | 105323830 A | 2/2016 |
| CN | 105611554 A | 5/2016 |
| CN | 102595564 B | 8/2016 |
| CN | 107409316 A | 11/2017 |
| CN | 110719593 A | 1/2020 |
| EP | 2154917 A1 | 2/2010 |
| EP | 2203011 A1 | 6/2010 |
| EP | 2271142 A1 | 1/2011 |
| EP | 2375807 A1 | 10/2011 |
| EP | 2533571 A1 | 12/2012 |
| EP | 2663131 A1 | 11/2013 |
| EP | 2806694 A1 | 11/2014 |
| EP | 2814279 A1 | 12/2014 |
| EP | 2916584 A1 | 9/2015 |
| EP | 2928225 A1 | 10/2015 |
| EP | 2975886 A1 | 1/2016 |
| EP | 3065438 A1 | 9/2016 |
| EP | 3224959 B1 | 2/2019 |
| EP | 3472994 A1 | 4/2019 |
| EP | 3474176 A1 | 4/2019 |

(56) References Cited

FOREIGN PATENT DOCUMENTS

| | | |
|---|---|---|
| GB | 2554543 A | 4/2018 |
| GB | 2554544 A | 4/2018 |
| GB | 2554543 B | 3/2019 |
| GB | 2554544 B | 3/2019 |
| GB | 2579042 A | 6/2020 |
| JP | 2010508761 A | 3/2010 |
| JP | 2013201576 A | 10/2013 |
| JP | 2015130644 A | 7/2015 |
| JP | 2015192252 A | 11/2015 |
| JP | 2016519553 A | 6/2016 |
| KR | 101907681 B1 | 10/2018 |
| WO | 2008054668 A2 | 5/2008 |
| WO | 2009022976 A1 | 2/2009 |
| WO | 2010024743 A1 | 3/2010 |
| WO | 2011028158 A1 | 3/2011 |
| WO | 2011056023 A2 | 5/2011 |
| WO | 2012138125 A2 | 10/2012 |
| WO | 2012148442 A1 | 11/2012 |
| WO | 2013022505 A1 | 2/2013 |
| WO | 2013071813 A1 | 5/2013 |
| WO | 2013120274 A1 | 8/2013 |
| WO | 2013142361 A1 | 9/2013 |
| WO | 2013167335 A1 | 11/2013 |
| WO | 2014111806 A1 | 7/2014 |
| WO | 2014161896 A1 | 10/2014 |
| WO | 2014175919 A1 | 10/2014 |
| WO | 2015006047 A1 | 1/2015 |
| WO | 2015019317 A1 | 2/2015 |
| WO | 2015034775 A1 | 3/2015 |
| WO | 2015060172 A1 | 4/2015 |
| WO | 2015062060 A1 | 5/2015 |
| WO | 2015104552 A1 | 7/2015 |
| WO | 2015134985 A1 | 9/2015 |
| WO | 2016056964 A1 | 4/2016 |
| WO | 2018059858 A1 | 4/2016 |
| WO | 2016079016 A1 | 5/2016 |
| WO | 2016134676 A1 | 9/2016 |
| WO | 2016146328 A1 | 9/2016 |
| WO | 2016151653 A1 | 9/2016 |
| WO | 2016185946 A1 | 11/2016 |
| WO | 2017003580 A1 | 1/2017 |
| WO | 2017148752 A1 | 9/2017 |
| WO | 2015020479 A1 | 4/2018 |
| WO | 2018059859 A1 | 4/2018 |
| WO | 2018059860 A1 | 4/2018 |
| WO | 2018111166 A1 | 6/2018 |
| WO | 2019015900 A1 | 1/2019 |
| WO | 2020038676 A1 | 2/2020 |
| WO | 2020098640 A1 | 5/2020 |
| WO | 2020098985 A1 | 5/2020 |

OTHER PUBLICATIONS

"3rd Generation Partnership Project, Technical Specification Group Radio Access Network, Evolved Universal Terrestrial Radio Access (EUTRA) and Evolved Universal Terrestrial Radio Access Network (E-UTRAN); Overall description; Stage 2 (Release 16)", 3GPP TS 36.300 V16.1.0 (Mar. 2020), 2020, 386 pages.

"3rd Generation Partnership Project; Technical Specification Group Radio Access Network; Evolved Universal Terrestrial Radio Access (E-UTRA); Potential solution for energy saving for EUTRAN (Release 15)", 3GPP TR 36.927 V15.0.0 (Jul. 2018), 2018, 22 pages.

"3rd Generation Partnership Project; Technical Specification Group Services and System Aspects; Telecommunication management; Energy Saving Management (ESM); Concepts and requirements (Release 15)", 3GPP TS 32.551 V15.0.0 (Jun. 2018), 2018, 26 pages.

"3rd Generation Partnership Project; Technical Specification Group Core Network and Terminals; Non-Access-Stratum (NAS) protocol for Evolved Packet System (EPS); Stage 3 (Release 17)", 3GPP TS 24.301 V17.2.0, Technical Specification, (Mar. 2021), 2021, 587 pages.

"Annex to the Commission Implementing Regulation", Specifying the Characteristics of Small-Area Wireless Access Points pursuant to Article 57(2) of Directive (EU) 2018/1972 of the European Parliament and the Council establishing the European Electronic Communications Code, Feb. 2020, 2 pages.

Combined Search and Examination Report received for Great Britain Patent Application No. 2009306.8, mailed Nov. 16, 2020, 5 pages.

"ETSI Technical Specification, Universal Mobile Telecommunications System (UMTS), LTE, 5G, Non-Access-Stratum (NAS) protocol for Evolved Packet System (EPS) Stage 3 (3GPP TS 24.301 version 16.8.0 Release 16)", ETSI TS 124 301 V16.8.0 (Apr. 2021), Available Online at <https://www.etsi.org/deliver/etsi_ts/124300_124399/124301/16.08.00_60/ts_124301v160800p.pdf>, 2021, pp. 1-575.

European Search Report received for Application No. 21173324.1, mailed on Jun. 17, 2022, 10 pages.

Extended European Search Report for Application No. 21173324.1, mailed on Oct. 29, 2021, 10 pages.

"Infrastructure Sharing: An Overview", GSMA, Future Networks, Retrieved from https://www.gsma.com/futurenetworks/wiki/infrastructure-sharing-an-overview/, Jun. 18, 2019, 18 pages.

International Preliminary Report on Patentability for Application No. PCT/EP2021/062478, completed on Sep. 26, 2022, 21 pages.

International Preliminary Report on Patentability received for PCT Patent Application No. PCT/EP2021/062479, completed on Sep. 23, 2022, 19 pages.

International Preliminary Report on Patentability received for PCT Patent Application No. PCT/EP2021/066406, completed on Aug. 30, 2022, 10 pages.

International Preliminary Report on Patentability received for PCT Patent Application No. PCT/EP2022/065836, mailed on Oct. 4, 2023, 9 pages.

International Search Report and Written Opinion for Application No. PCT/EP2021/062478, mailed on Aug. 25, 2021, 23 pages.

International Search Report and Written Opinion received for PCT Patent Application No. PCT/EP2021/062479, mailed on Jul. 22, 2021, 20 pages.

International Search Report and Written Opinion received for PCT Patent Application No. PCT/EP2021/066406, mailed on Oct. 14, 2021, 14 pages.

International Search Report and Written Opinion received for PCT Patent Application No. PCT/EP2022/065836, mailed on Oct. 6, 2022, 16 pages.

"Joint Operators Technical Specification of the Neutral Host In-building Solution", JOTS NHIB Specification—Annex 1—Architecture Version 0.11 (Advanced Draft), pp. 1-57.

Office Action received for Great Britain Patent Application No. 2009328.2, mailed on Dec. 1, 2020, 5 pages.

Office Action received for Great Britain Patent Application No. 2009339.9, mailed on Dec. 15, 2020, 7 pages.

Office Action received for Great Britain Patent Application No. 2009328.2, mailed on Jul. 20, 2022, 3 pages.

Office Action received for Great Britan Patent Application No. 2009328.2 mailed on Oct. 18, 2022, 3 pages.

Office Action received for Great Britan Patent Application No. 2108635.0, mailed on Mar. 25, 2022, 14 pages.

Office Action received for Japanese Patent Application No. 2021-099329, mailed on Apr. 26, 2022, 5 pages (English Translation Only).

Search Report received for Great Britain Patent Application No. 2009312.6, mailed on Nov. 23, 2020, 4 pages.

Written Opinion of the International Preliminary Examination received for PCT Patent Application No. PCT/EP2021/062478, mailed on Jun. 22, 2022, 15 pages.

Written Opinion of the International Preliminary Examination received for PCT Patent Application No. PCT/EP2021/066406, mailed on Jun. 9, 2022, 9 pages.

Written Opinion of the International Preliminary Examining Authority for Application No. PCT/EP2021/062479, mailed on Jun. 17, 2022, 9 pages.

Written Opinion received for PCT Patent Application No. PCT/EP2022/065836, mailed on Apr. 26, 2023, 8 pages.

(56) References Cited

OTHER PUBLICATIONS

4G Ameucas, "Self-Optimizing Networks: The Benefits of SON in LTE", GSM Association, XP040674838, Jul. 2011, 69 pages.
Barakat, et al., et al., "Energy Efficient Carrier Aggregation for LTE Advanced", Proceedings of the 8th IEEE GCC Conference and Exhibition, Feb. 1-4, 2015, 5 pages.
Chavarria, et al., "Energy-Efficient Multi-Stream Carrier Aggregation for Heterogeneous Networks in 5G Wireless Systems", IEEE Transactions on Wireless Communications, vol. 15, No. 11, Nov. 2016, pp. 7432-7443.
Kumar, et al., "Energy Efficient Rate Coverage with Base Station Switching and Load Sharing in Cellular Networks", 2016 8th International Conference on Communication Systems and Networks (COMSNETS), 2016, 6 pages.
Morris, David, "JOTS Neutral Host In-Building", Telefonica UK, Sep. 17, 2019, 16 pages.
Opadere, et al., "Energy-Efficient RRH Sleep Mode for Virtual Radio Access Networks", IEEE, 2017, 6 pages.
Opadere, et al., "Energy-Efficient Virtual Radio Access Networks for Multi-Operators Cooperative Cellular Networks", IEEE Transactions on Green Communications and Networking, vol. 3, No. 3, Sep. 2019, pp. 603-614.
Melanie, "An Introduction to Genetic Algorithms", Fifth Printing, 1999, 162 pages.
Zhang, et al., "Distributed Hash Table Theory, Platforms and Applications", Springer Briefs in Computer Science, 2013, 73 pages.
"Recommended Practices for multi-vendor SON deployment", NGNM the engine of broadband wireless innovation Deliverable D2 Version 1.0 by NGNM Alliance; Reading Bridge House George Street Reading Berkshire RG 1 8LS UK, Jan. 28, 2014, 30 pages.
"Small Cell Forum Release 9.0; Document 176.09.01 LTE small cell SON test cases: Functionality and interworking; version 176. 09.01", Feb. 21, 2017, 95 pages.
3GPP 36.420 v8.0.0 (Dec. 2007), "X2 general aspects and principals; Technical Specification; 3 Generation Partnership Project (Dec. 2007)", http://www.mc.ioi3GPP/Specs/36420-800.pdf, Dec. 2007, 11 pages.
3GPP TR 24.826 V11.0.0 (Jun. 2011), "3rd Generation Partnership Project; Technical Specification Group Core Network and Terminals; Study on impacts on signaling between User Equipment (UE) and core network from energy saving (Release 11)", 650 Route des Luciales—Sophia Antipolis Valbonne—France, 33 pages.
3GPP TR 32.816 V8.0.0 (Dec. 2008), "3rd Generation Partnership Project; Technical Specification Group Services and System Aspects; Telecommunication Management; Study on Management of Evolved Universal Terrestrial Radio Access Network (E-UTRAN) and Evolved Packet", Dec. 2008, 38 pages.
3GPP TR 36.942 V9.3.0, "Technical Specification Group Radio Access Network; Evolved Universal Terrestrial Radio Access (E-UTRA)", 3rd Generation Partnership Project; Radio Frequency (RF) system scenarios (Release 9), Jun. 2012, 83 pages.
3GPP TS 36.300 V11.6.0 (Jun. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 650 Route des Luciales—Sophia Antipolis Valbonne—France, 2013, 209 pages.
3GPP TS 36.300 V13.3.0 (Mar. 2016), "3rd Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2 (Release 13)", 650 Route des Luciales—Sophia Antipolis Valbonne—France, 2016, 295 pages.
3GPP TS 36.300 V14.2.0 (Mar. 2017), "Technical Specification Group Radio Access Network, Evolved Universal Terrestrial Radio Access (E-UTRA) and Evolved Universal Terrestrial Radio Access Network (E-UTRAN)", 3rd Generation Partnership Project, Overall description, Stage 2 (Release 14), 2017, 330 pages.
3GPP TS 36.423 V14.2.0 (Mar. 2017), "Technical Specification Group Radio Access Network, Evolved Universal Terrestrial Radio Access Network (E-UTRAN)", 3rd Generation Partnership Project, X2 application protocol (X2AP) (Release 14), 2017, 242 pages.
3GPP, "Issues on X2-GW deployment", 3rd Generation Partnership Project (3GPP), 3GPP TSG-RAN3 Meeting #79bis, R3-130571, Apr. 2013, 6 pages.
Alam, et al., "Annotated Control Flow Graph for Metamorphic Malware Detection", The Computer Journal, vol. 58, No. 10, 2014, 14 pages.
Briggs, et al., "Application and Filing Receipt for U.S. Appl. No. 16/079,327, filed Aug. 23, 2018".
Bruschi, et al., "Using Code Normalization for Fighting Self-Mutating Malware", Rapporto Tecnico N., Mar. 2006, 14 pages.
Carlson, et al., "Scheduling to Minimize Interaction Cost", The Johns Hopkins University, Baltimore, Maryland, Jun. 2, 1965, 8 pages.
Codan Radio, "RF Link Controlled Base Station", Codan Radio Communications https://www.codanradio.com/nroduct/rf-link-controlled-base [retrieved on Oct. 3, 2018], Aug. 8, 2017, 2 pages.
Office Action received for Great Britain Patent Application No. 1616539.1, mailed on Mar. 2, 2017, 6 pages.
Office Action received for Great Britain Patent Application No. 1616530.0, mailed on Feb. 23, 2017, 6 pages.
Office Action received for Great Britain Patent Application No. 1713816.5, mailed on Sep. 20, 2017, 5 pages.
Office Action received for Great Britain Patent Application No. 1616534.2, mailed on Mar. 1, 2017, 8 Pages.
Office Action received for Great Britain Patent Application No. 1713815.7, mailed on Sep. 21, 2017, 5 pages.
Office Action received for European Patent Application No. 17761237.1, mailed on Dec. 8, 2020, 8 pages.
Office Action received for European Patent Application No. 17764775.7, mailed on May 20, 2021, 5 pages.
Office Action received for European Patent Application No. 17764775.7, mailed on Sep. 3, 2020, 5 pages.
Extended European Search Report received for European Patent Application No. 15187067.2, mailed on Mar. 18, 2016, 8 pages.
Eskandari, et al., "A Graph Mining Approach for Detecting Unknown Malwares", Journal of Visual Languages & Computing, vol. 23, No. 3, 2012, pp. 154-162.
ETSI TR 136 927 V13.0.0 (Jan. 2016), "Technical Report LTE; Evolved Universal Terrestrial Radio Access (E-UTRA); Potential solutions for energy saving for EUTRAN (3GPP TR 36.927 version 13.0.0 Release 13)", 650 Route des Luciales—Sophia Antipolis Valbonne—France, 26 pages.
ETSI TS 132 551 V13.0.0 (Feb. 2016), "Technical Specification Universal Mobile Telecommunications System (UMTS); LTE; Telecommunication management; Energy Saving Management (ESM); Concepts and requirement (3GPP TS 32.551 version 13.0.0 Release 13)", 650 Route des Luciales—Sophia Antipolis Valbonne—France, 28 pages.
Extended European Search Report received for European Patent Application No. 16158665.6 mailed on Sep. 13, 2016, 6 pages.
Extended European Search Report received for European Patent Application No. 16160809.6 mailed on Sep. 26, 2016, 14 pages.
Extended European Search Report received for European Patent Application No. 16191517.8, mailed Mar. 27, 2017, 8 pages.
Extended European Search Report received for European Patent Application No. 16191519.4, mailed on Mar. 31, 2017, 8 pages.
Extended European Search Report received for European Patent Application No. 16191524.4, mailed on Apr. 7, 2017, 10 pages.
Extended European Search Report received for European Patent Application No. 17180358.8, mailed on Jan. 31, 2018, 5 pages.
Office Action received for Great Britain Patent Application No. 1713816.5, mailed on Oct. 10, 2017, 3 pages.
Office Action received for Great Britain Patent Application No. 1713816.5, mailed on Nov. 15, 2018, 3 pages.
Office Action received for Great Britain Patent Application No. 1713815.7, mailed on Nov. 15, 2018, 3 pages.
Extended European Search Report received for European Patent Application No. 17181876.8, mailed on Jan. 8, 2018, 11 pages.

(56) References Cited

OTHER PUBLICATIONS

Extended European Search Report received for European Patent Application No. 19194981.7, mailed on Nov. 27, 2019, 8 pages.
Extended European Search Report received for European Patent Application No. EP14194204.5, mailed on Jul. 23, 2015, 7 pages.
Extended European Search Report received for European Patent Application No. 15275077.4 mailed on Sep. 4, 2015, 8 pages.
Fairbrother, et al., "A Two-Level Graph Partitioning Problem Arising in Mobile Wireless Communications", arXiv: 1705.08773v1 [math.QC], May 24, 2017, 23 pages.
Fitch, et al., "Application and Filing Receipt for U.S. Appl. No. 15/516,765, filed Apr. 4, 2017".
Fitch, et al., "Application and Filing Receipt for U.S. Appl. No. 15/553,708, filed Aug. 25, 2017".
Office Action received for Great Britain Patent Application No. 1711529.6, mailed on Dec. 13, 2017, 7 pages.
Office Action received for Great Britain Patent Application No. 1603748.3, mailed on Aug. 26, 2016, 6 pages.
Office Action received for Great Britain Patent Application No. 1517069.9, mailed on Jan. 31, 2018, 3 pages.
Office Action received for Great Britain Patent Application No. 1710989.3, mailed on Dec. 1, 2017, 5 pages.
Office Action received for Great Britain Patent Application No. 1517069.9, mailed on Mar. 7, 2016, 4 pages.
Ghaddar, et al., "A branch-and-cut algorithm based on semidefinite programming for the minimum k-parition problem", Ann Oper Res DOI 10 1007/s10479-008-0481-4, Springer Science+Business Media, LLC 2008, Dec. 3, 2008, 20 pages.
Hearing Notice received for Indian Patent Application No. 202114021339, mailed on Jan. 24, 2024, 2 pages.
Huawei, "Report of Email Discussion [97bis#19][LTE/FeD2D]-Grouphandover", 3GPP Draft, R2-1705300, 3rd Generation Partnership Project (3GPP), 3GPP TSG RAN WG2#98, Hangzhou, China, May 15-19, 2017, 18 pages.
Notice of Allowance received for Great Britain Patent Application No. 1713815.7, mailed on Jan. 14, 2019, 2 pages.
Notice of Allowance received for Great Britain Patent Application No. 1713816.5, mailed on Jan. 14, 2019, 2 pages.
International Preliminary Report on Patentability received for PCT Patent Application No. PCT/EP2017/071645, mailed on Apr. 11, 2019, 14 pages.
International Preliminary Report on Patentability received for PCT Patent Application No. PCT/EP2017/071646, mailed on Apr. 11, 2019, 8 pages.
International Preliminary Report on Patentability received for PCT Patent Application No. PCT/EP2017/071649, mailed on Apr. 11, 2019, 8 pages.
International Preliminary Report on Patentability received for PCT Patent Application No. PCT/EP2016/069745, mailed Oct. 20, 2017, 13 pages.
International Preliminary Report on Patentability received for PCT Patent Application No. PCT/EP2015/076524 mailed on Mar. 7, 2017, 11 pages.
International Preliminary Report on Patentability received for PCT Patent Application No. PCT/EP2016/053286, completed on Feb. 6, 2017, 13 pages.
International Preliminary Report on Patentability received for PCT Patent Application No. PCT/EP2017/052738, completed on Jun. 22, 2018, 25 pages.
International Preliminary Report on Patentability received for PCT Patent Application No. PCT/EP2017/053957, mailed on Sep. 13, 2018, 7 pages.
International Preliminary Report on Patentability received for PCT Patent Application No. PCT/EP2021/065634, mailed on Sep. 27, 2022, 10 pages.
International Preliminary Report on Patentability received for PCT Patent Application No. PCT/EP2021/065635, mailed on Sep. 22, 2022, 8 pages.
International Preliminary Report on Patentability received for PCT Patent Application No. PCT/EP2021/065638, mailed on Jun. 22, 2022, 8 pages.
International Preliminary Report on Patentability received for PCT Patent Application No. PCT/EP2021/064836, completed on Sep. 6, 2022, 10 pages.
International Search Report and Written Opinion received for PCT Patent Application No. PCT/EP2016/053286, mailed on Apr. 11, 2016, 11 pages.
International Search Report and Written Opinion received for PCT Patent Application No. PCT/EP2016/069745, mailed on Nov. 11, 2016, 9 pages.
International Search Report and Written Opinion received for PCT Patent Application No. PCT/EP2017/071646, mailed on Oct. 18, 2017, 9 pages.
International Search Report and Written Opinion received for PCT Patent Application No. PCT/EP2017/071649, mailed on Oct. 12, 2017, 9 pages.
International Search Report and Written Opinion received for PCT Patent Application No. PCT/EP2018/066116, mailed on Aug. 29, 2018, 11 pages.
International Search Report and Written Opinion received for PCT Patent Application No. PCT/EP2021/064836 mailed on Sep. 1, 2021, 13 pages.
International Search Report and Written Opinion received for PCT Patent Application No. PCT/EP2017/053957, mailed on May 23, 2017, 11 pages.
International Search Report and Written Opinion received for PCT Patent Application No. PCT/EP2015/076524, mailed on Dec. 21, 2015, 11 pages.
International Search Report and Written Opinion received for PCT Patent Application No. PCT/EP2017/052738, mailed on Mar. 27, 2017, 17 pages.
International Search Report and Written Opinion received for PCT Patent Application No. PCT/EP2017/071645, mailed on Nov. 27, 2017, 18 pages.
International Search Report and Written Opinion received for PCT Patent Application No. PCT/EP2021/065634, mailed on Jul. 30, 2021, 16 pages.
International Search Report and Written Opinion received for PCT Patent Application No. PCT/EP2021/065635, mailed on Aug. 30, 2021, 14 pages.
International Search Report and Written Opinion received for PCT Patent Application No. PCT/EP2021/065638, mailed on Aug. 30, 2021, 13 pages.
Invitation to Pay Additional Fees and, where applicable, Protest Fee received for PCT Patent Application No. PCT/EP2017/071645, mailed on Oct. 9, 2017, 13 pages.
Kang, et al., "Malware Classification Method via Binary Content Comparison", RAGS 12, 2012, pp. 316-321.
MacKenzie, et al., Application and Filing Receipt for U.S. Appl. No. 16/947,152, filed Jul. 21, 2020.
MacKenzie, et al., Application and Filing Receipt for U.S. Appl. No. 15/762,022, filed Mar. 21, 2018.
MacKenzie, et al., Application and Filing Receipt for U.S. Appl. No. 16/335,708, filed Mar. 22, 2019.
MacKenzie, et al., Application and Filing Receipt for U.S. Appl. No. 16/335,802, filed Mar. 22, 2019.
MacKenzie, et al., Application and Filing Receipt for U.S. Appl. No. 16/335,863, filed Mar. 22, 2019.
MacKenzie, et al., Application and Filing Receipt for U.S. Appl. No. 16/023,917, filed Jun. 29, 2018.
MacKenzie, et al., Application and Filing Receipt for U.S. Appl. No. 16/082,870, filed Sep. 6, 2018.
MacQueen, "Some Methods for Classification and Analysis of Multivariate Observations", Fifth Berkeley Symposium, University of California, Los Angeles, 1967, pp. 281-297.
Motorola, et al., "Draft CR capturing HeNB inbound mobility agreements", 3GPP Draft; R2-096401 CR HENB 36_300 Agreements_ V7, 3rd Generation Partnership Project (3GPP), Jeju, Korea XP050391033, Nov. 9, 2009, 4 pages.
Mukhopadhyay, et al., "Novel RSSI Evaluation Models for Accurate Indoor Localization with Sensor Networks", 978-1-4799-2361-

(56) References Cited

OTHER PUBLICATIONS

8/14, 2014 IEEE, Bharti School of Telecommunication Technology and Management IIT Delhi Hauz Khas, New Delhi, 2014, 6 pages.
New Postcom, "X2 Connection and Routing for X2-GW Deployment", 3GPPDRAFT, R3-130225, 3rd Generation Partnership Project (3GPP), 3GPP TSG RAN WG3 Meeting #79, St. Julian's, Malta, Jan. 28-Feb. 1, 2013, 3 pages.
Ning, et al., "Fuzzy layered physical cell identities assignment in heterogeneous and small cell networks", Electronics Letters, vol. 52, No. 10, May 12, 2016, 2 pages.
Nokia Siemens Networks, "X2 Interface Proxy at DeNB", R3-101662, 3rd Generation Partnership Project(3GPP), 3GPP TSG-RAN WG Meeting #70, Montreal, Canada, May 10-14, 2010, 5 pages.
Office Action received for Chinese Patent Application No. 201780059576.7, mailed on Apr. 28, 2021, 14 pages (10 pages of English Translation and 4 pages of Official Copy).
Office Action received for Chinese Patent Application No. 201780059576.7, mailed on Dec. 27, 2021, 12 pages (7 pages of English Translation and 5 pages of Official Copy).
Office Action received for Chinese Patent Application No. 201780059626.1, mailed on Apr. 30, 2021, 12 pages (8 pages of English Translation and 4 pages of Official Copy).
Office Action received for Chinese Patent Application No. 201780059626.1, mailed on Dec. 27, 2021, 16 pages (10 pages of English Translation and 6 pages of Official Copy).
Office Action received for Chinese Patent Application No. 201780060189.5, mailed on Apr. 27, 2021, 14 pages (10 pages of English Translation and 4 pages of Official Copy).
Office Action received for Chinese Patent Application No. 201780060189.5, mailed on Sep. 23, 2021, 7 pages (English Translation only).
Office Action received for Chinese Patent Application No. 202110620333.4, mailed on Nov. 28, 2023, 12 pages (6 pages of English Translation and 6 pages of Official Copy).
Office Action received for Chinese Patent Application No. 202111049025.7, mailed on Oct. 12, 2023, 11 pages (7 pages of English Translation and 4 pages of Official Copy).
Office Action received for Great Britain Patent Application No. 2010892.4, mailed on Mar. 30, 2021, 10 pages.
Office Action received for Great Britain Patent Application No. 2010898.1, mailed on Nov. 11, 2020, 5 pages.
Office Action received for Great Britain Patent Application No. 2008756.5, mailed on Feb. 23, 2021, 11 pages.
Araujo, et al., "Diversity Through Multiculturality: Assessing Migrant Choice Policies In an Island Model", IEEE Transactions on Evolutionary Computation, vol. 15, No. 4, Aug. 2011, pp. 456-469.
Badotra, et al., "Open Daylight as a Controller for Software Defined Networking", International Journal of Advanced Research in Computer Science, vol. 8, No. 5, May 2017, pp. 1105-1111.
Office Action received for Indian Patent Application No. IN202217068278, mailed on Jan. 23, 2024, 6 pages.
Office Action received for Japanese Patent Application No. 2022-577670 dated Jan. 30, 2024, 4 pages (English Translation only).
Ahn, et al., "A Genetic Algorithm for Shortest Path Routing Problem and the Sizing of Populations", IEEE Transactions on Evolutionary Computation, vol. 6, No. 6, Dec. 2002, pp. 566-579.
Alba, et al., "Solving the Vehicle Routing Problem by Using Cellular Genetic Algorithms", Lecture Notes in Computer Science, Apr. 2004, 11 pages.
Antonopoulos, "Mastering Bitcoin—Unlocking Digital Crypto-Currencies", O'Reilly Media, 2014, 282 pages.
Qualcomm Europe, "Qos support for hybrid CSG cells", 3GPP Draft; R3-091454, 3rd Generation Partnership Project (3GPP), San Francisco, US; XP050341776., May 4, 2009, 3 pages.
Qualcomm Europe, et al., "QoS principles for CSG members and nonmembers at hybrid access mode HeNBs", 3GPP Draft; R3-091022, 3rd Generation Partnership Project (3GPP), San Francisco, US XP050341407, May 4-8, 2009, 4 pages.
Qualcomm Technologies, Inc, "LTE Small Cell SON Test Cases, Functionality and Interworking", San Diego, CA, USA, Jun. 5, 2015, 82 Pages.
Reasons for Refusal received for Japanese Patent Application No. 2022-577667, mailed on Jan. 9, 2024, 6 pages. (3 pages of English Translation and 3 pages of Official Copy).
Reasons for Refusal received for Japanese Patent Application No. 2023-577725, mailed on Jun. 11, 2024, 4 pages (English Translation only).
Rendl, F, "Semidefinite Relaxations for Partitioning, Assignment and Ordering Problems", Cross Mark, Ann Oper Res (2016) 240 119-140 DOI 101007/s10479-015-2015-1; Springer Science+ Business Media New York 2015 , Sep. 15, 2015, 22 pages.
Barbosa, et al., "Access Point Design with a Genetic Algorithm", Sixth International Conference on Genetic and Evolutionary Computing, 2012, pp. 119-123.
Office Action received for Great Britain Patent Application No. 1604515.5, mailed Sep. 9, 2016, 3 pages.
Office Action received for Great Britain Patent Application No. 1604515.5, mailed on May 11, 2017, 1 page.
Office Action received for Great Britain Patent Application No. 1604515.5, mailed on Jan. 31, 2018, 3 pages.
Office Action received for Great Britain Patent Application No. 1604515.5, mailed on May 2018, 2 pages.
Web article, "DSDP", NEOS Interfaces to DSDP, Jul. 3, 2017, 4 pages.
Web article, "Welcome to CVXPY", Welcome to CVXPY—CVXPY 0.4.9 documentation, Jul. 3, 2017, 1 page.
Chen, et al., "Analysis of Ant Colony Algorithm for Finding the Optimal Circuitous Route in the Communication Network of Power System", 5th International Conference on Electric Utility Deregulation and Restructuring and Power Technologies, Nov. 26-29, 2015, pp. 2532-2535.
Erickson , "The Beacon OpenFlow Controller", HotSDN '13, Proceedings of the second ACM SIGCOMM workshop on Hot topics in software defined networking, Aug. 16, 2013, 6 pages.
Gill, et al., Transformative Effects of IoT, Blockchain and Artificial Intelligence on Cloud Computing: Evolution, Vision, Trends and Open Challenges:, Cornell University Library, available at https://arxiv.org/ftp/arxiv/papers/1911/1911.01941.pdf, Oct. 19, 2019, 30 pages.
Written Opinion of the International Preliminary Examination Authority received for PCT Patent Application No. PCT/EP2021/065634, mailed on Jun. 13, 2022, 10 pages.
Written Opinion of the International Preliminary Examination Authority received for PCT Patent Application No. PCT/EP2021/065635, mailed on Jun. 13, 2022, 7 pages.
Written Opinion of the International Preliminary Examination Authority received for PCT Patent Application No. PCT/EP2021/064836, mailed on May 6, 2022, 7 pages.
Wu, et al., "Physical Cell Identity Self-Organization for Home eNodeB Deployment in LTE", Hai Jiang Yi, Nokia Siemens Networks, 978-1-4244-3709-2/10, IEEE, Beijing China, 2010, 6 pages.
Younis, et al., "Cognitive MANET Design for Mission-Critical Networks", Military Communications; IEEE Communications Magazine, 0163-6804/09 2009 IEEE, Oct. 2009, 5 pages.
Zhong, et al., "A Malware Classification Method based on Similarity of Function Structure", IEEE/IPSJ 12th International Symposium on Applications and the Internet, IEEE Computer Society, 2012, pp. 256-261.
Office Action received for European Patent Application No. 21173324.1, mailed on Jul. 18, 2023, 5 pages.
Office Action received for Japanese Patent Application No. 2022-577670, mailed on Oct. 3, 2023, 2 pages (English Translation Only).
Office Action received for Japanese Patent Application No. 2022-577669, mailed on Oct. 17, 2023, pages (English Translation Only).
United States Notice of Allowance dated Sep. 30, 2024 for U.S. Appl. No. 18/005,731.

* cited by examiner

CELLULAR TELECOMMUNICATIONS NETWORK

PRIORITY CLAIM

The present application is a National Phase entry of PCT Application No. PCT/EP2022/065836, filed Jun. 10, 2022, which claims priority from GB Application No. 2108635.0, filed Jun. 17, 2021, each of which hereby fully incorporated herein by reference.

TECHNICAL FIELD

The present disclosure relates to a cellular telecommunications network.

BACKGROUND

In cellular telecommunications networks, a User Equipment (UE) and base station may communicate using a cellular telecommunications protocol. Voice service is a key component of these protocols to enable voice traffic to be communicated from a UE to another node in the cellular telecommunications network (typically another UE). In many early telecommunications protocols, such as the $2^{nd}$ Generation (2G) protocol defined by the Global System for Mobile Communication (GSM) and the $3^{rd}$ Generation (3G) protocol defined by $3^{rd}$ Generation Partnership Project (3GPP), voice services utilized circuit switched data transmission. In other, typically more recent, cellular telecommunications protocols, such as the 4th Generation (4G) and 5th Generation (5G) protocols defined by 3GPP, voice services utilized packet switched data transmission (e.g. Voice-Over-Internet-Protocol, VOIP).

As new generations of telecommunications protocol are introduced, Mobile Network Operators (MNOs) must upgrade or replace their infrastructure to support users of these new generations. As the number of users of the older telecommunications protocols decreases, it becomes less economically viable to operate the older infrastructure. Nonetheless, there are still reasons to maintain this older infrastructure, such as to provide access to an emergency services network to users that can only access such a network through a circuit switched voice service.

SUMMARY

According to a first aspect of the disclosure, there is provided a method of operating a first base station in a cellular telecommunications network, wherein the cellular telecommunications network includes a User Equipment, UE, and a management node, the management node being configured to determine, based on a tracking area code, whether a base station associated with the tracking area code supports a circuit switched voice service, the method comprising determining whether the first base station supports a circuit switched voice service; transmitting a first tracking area code if the first base station supports the circuit switched voice service, or otherwise transmitting a second tracking area code; on receipt of a tracking area update request message from the UE identifying the first or second tracking area code transmitted by the first base station, sending a first message to the management node including the first or second tracking area code identified in the tracking area update request message; and on receipt of a response message from the management node indicating whether the UE is accepted or rejected by the management node, sending a second message to the UE including the acceptance or rejection indicated in the response message.

Determining whether the first base station supports the circuit switched voice service may include a determination of whether the circuit switched voice service has entered energy saving mode, a determination of whether the circuit switched voice service is supported in a geographical area, or a determination of whether the circuit switched voice service has a spectrum assignment.

According to a second aspect of the disclosure, there is provided a method of operating a management node in a cellular telecommunications network, the cellular telecommunications network including a first base station and a User Equipment, UE, the management node storing a first set of tracking area codes, wherein the first base station is configured to transmit a first tracking area code and the UE is configured to send a tracking area update request message to the first base station identifying the first tracking area code, the method comprising receiving a request message from the first base station, the request including the first tracking area code identified in the tracking area update request message; comparing the received first tracking area code to the first set of tracking area codes; and sending a response message to the first base station, the response message accepting or rejecting the tracking area request based on the comparison.

Each of the first set of tracking area codes may be associated with a base station that supports a circuit switched voice service, and accepting or rejecting the tracking area request may include accepting the tracking area request if the received tracking area code is one of the first set of tracking area codes.

Each of the first set of tracking area codes may be associated with a base station that does not support a circuit switched voice service, and accepting or rejecting the tracking area request may include rejecting the tracking request if the receiving tracking area code is one of the first set of tracking area codes.

The management node may store a second set of tracking area codes and each of the second set of tracking area codes may be associated with a base station that does not support a circuit switched voice service, and accepting or rejecting the tracking area request may include rejecting the tracking area request if the received tracking area code is one of the second set of tracking area codes.

The response message may identify the first tracking area code as forbidden.

According to a third aspect of the disclosure, there is provided a computer program comprising instructions which, when the program is executed by a computer, cause the computer to carry out the method of the first or second aspect of the disclosure. The computer program may be stored on a computer readable carrier medium.

According to a fourth aspect of the disclosure, there is provided a first base station for a cellular telecommunications network having a processor configured to carry out the first aspect of the disclosure.

According to a fifth aspect of the disclosure, there is provided a management node for a cellular telecommunications network having a processor configured to carry out the method of the second aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
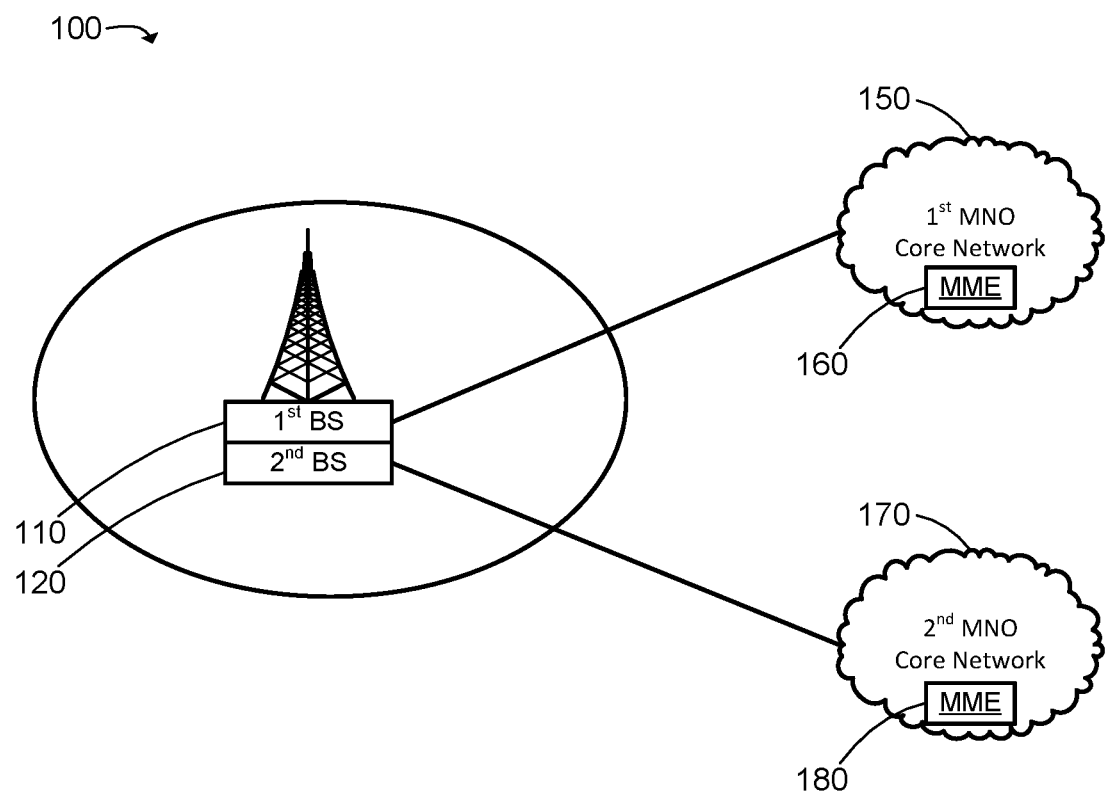
FIG. 1 is a schematic diagram of a cellular telecommunications network of a first embodiment of the present disclosure.

A first embodiment of a cellular telecommunications network 100 will now be described with reference to FIG. 1. FIG. 1 illustrates a first base station 110 of a first Mobile Network Operator (MNO). The first base station 110 connects to a first core network 150 of the first MNO, which includes a first Mobility Management Entity (MME) 160. FIG. 1 also illustrates a second base station 120 of a second MNO, which connects to a second core network 170 of the second MNO, which includes a second MME 180.

The first base station 110 and second base station 120 are each configured to transmit a tracking area code. In the following embodiments, the first base station 110 is configured to transmit a first tracking area code if the first base station 110 provides a circuit switched voice service for users of the first MNO's network and to transmit a second tracking area code if the first base station 100 does not provide a circuit switched voice service to users of the first MNO's network. Similarly, the second base station 120 is configured to transmit a third tracking area code if the second base station 120 provides a circuit switched voice service to users of the second MNO's network and to transmit a fourth tracking area code if the second base station 120 does not provide a circuit switched voice service to users of the second MNO's network.

The first MME 160 stores a database of tracking area codes in which a first set of tracking area codes are associated with base stations that provide a circuit switched voice service to users of the first MNO's network and a second set of tracking area codes are associated with base stations that do not provide a circuit switched voice service to users of the first MNO's network. In this embodiment, the first set of tracking area codes stored in the first MME's database includes the first tracking area code, and the second set of tracking area codes stored in the first MME's database includes the second tracking area code.

Similarly, the second MME 180 stores a database of tracking area codes in which a first set of tracking area codes are associated with base stations that provide a circuit switched voice service to users of the second MNO's network and a second set of tracking area codes are associated with base stations that do not provide a circuit switched voice service to users of the second MNO's network. In this embodiment, the first set of tracking area codes stored in the second MME's database includes the third tracking area code, and the second set of tracking area codes stored in the second MME's database includes the fourth tracking area code.

Figure 2:
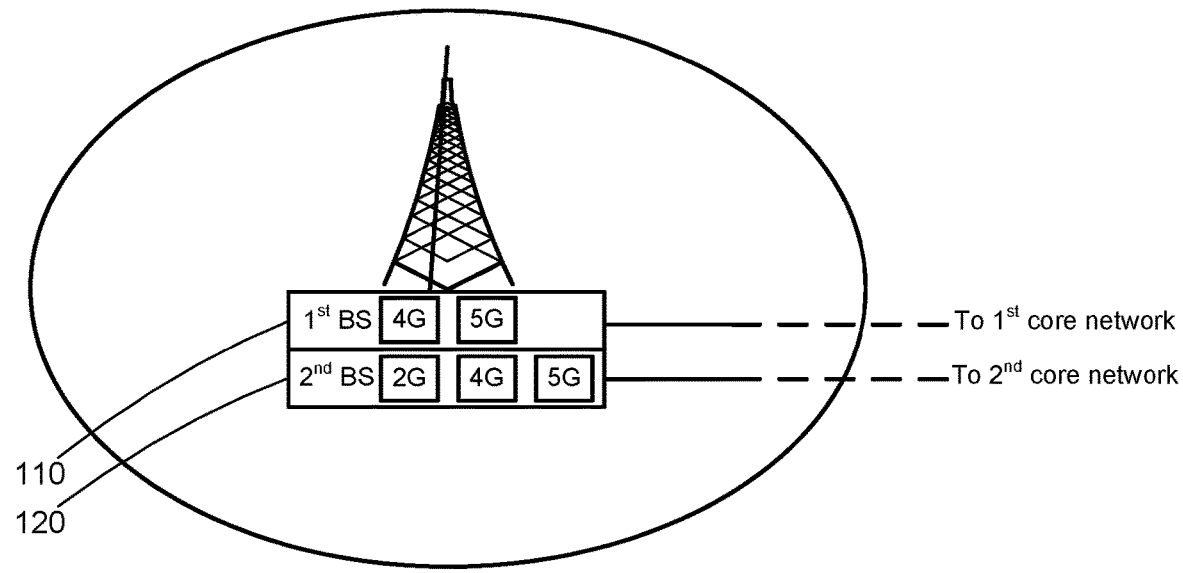
FIG. 2 is a schematic diagram of the network of FIG. 1 in a first state.
Figure 3:
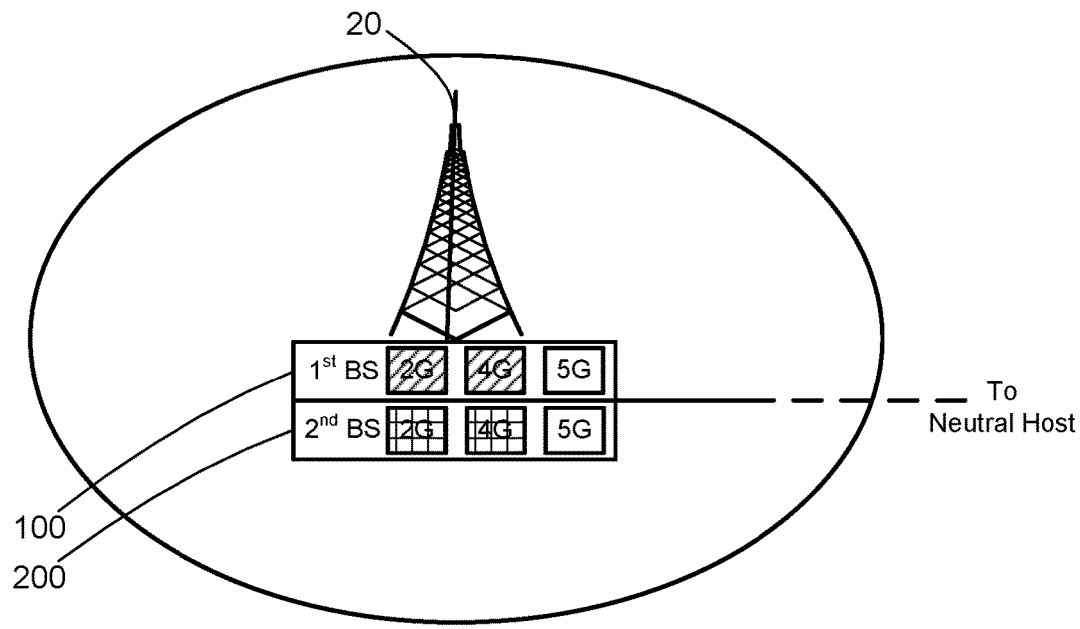
FIG. 3 is a schematic diagram of the network of FIG. 1 in a second state.

A first embodiment of a method of the present disclosure will now be described with reference to FIGS. 2 to 4. As shown in FIG. 2, the first and second base stations 110, 120 are in an initial configuration in which the first base station 110 is configured to provide a "4G" service (i.e. based on one or more of Release 8 to Release 14 of the $3^{rd}$ Generation Partnership Project (3GPP)), and a "5G" service (i.e. based on one or more of Release 15 and any subsequent Release of 3GPP considered as a 5G service), and the second base station 120 is configured to provide 4G and 5G services and is further configured to provide a "2G" service (i.e. based on one or more of the Global System for Mobile Communications (GSM) specifications). The first base station 110 therefore provides packet switched voice services via Voice of Internet Protocol (VoIP) technology, and the second base station 120 provides packet switched voice services via VoIP for any 4G and 5G users or via a circuit switched voice service for 2G users (the VoIP 4G/5G service is optional, as the 2G voice service may be used for all voice services and 4G/5G used for data services).

In this initial configuration, the first base station 110 broadcasts the second tracking area code (indicating that it does not provide a circuit switched voice service to users of the first MNO's network) and the second base station 120 broadcasts the third tracking area code (indicating that it does provide a circuit switched voice service to users of the second MNO's network).

Figure 4:
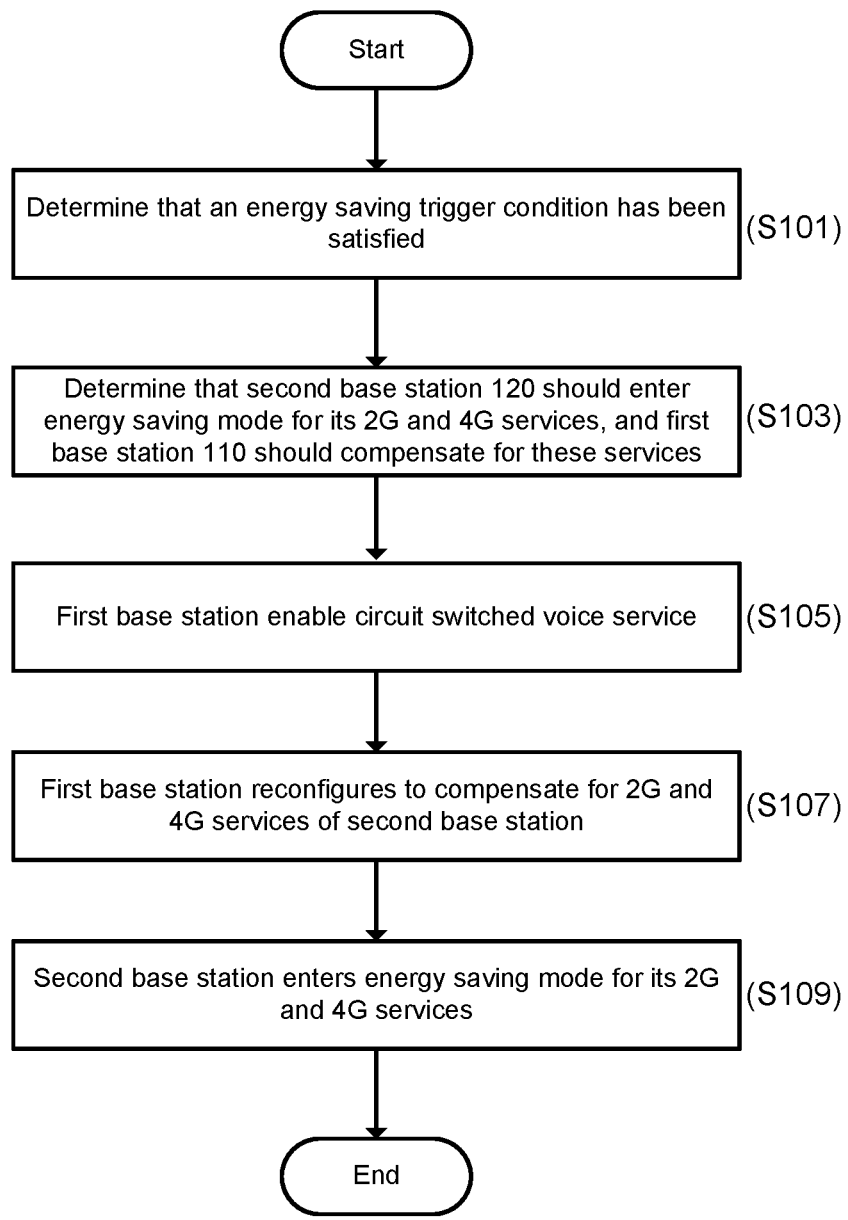
FIG. 4 is a flow diagram of a first embodiment of a method of the present disclosure.

In S101 of this embodiment, as shown in the flow diagram of FIG. 4, the second base station 120 determines that an energy saving trigger condition has been satisfied. In S103, it is determined (e.g. by negotiation between the first and second base stations 110, 120) that the second base station 120 should enter energy saving mode for its 2G and 4G services (thus maintaining its 5G service), and the first base station 110 should enable a 2G service and enter compensation mode for the second base station's 2G and 4G services.

In S105, the first base station 110 enables a 2G service. The first base station 110 may enable the 2G service by activating a 2G radio function and utilizing the first MNO's 2G licensed spectrum (that previously wasn't being used by the first base station 110). In other implementations, the first base station 110 may reassign spectrum ("refarm") from other protocols (e.g. the first MNO's 4G and/or 5G spectrum) to be used for 2G services, use some of second MNO's licensed spectrum (either the 2G spectrum or refarmed 4G spectrum) for 2G services (e.g. under a spectrum sharing agreement), use shared licensed spectrum (e.g. Licensed Shared Access), or unlicensed spectrum.

In S107, the first base station 110 reconfigures to compensate for the second base station 120. This includes a switch from a Multi-Operator Radio Access Network (MO-RAN) configuration to a Multi-Operator Core Network (MOCN) configuration, in which the first base station 110 begins transmitting both the first MNO's Public Land Mobile Network (PLMN) identifier and the second MNO's PLMN identifier, and accepts handovers and redirections of all users being served by the second base station 120. As part of this reconfiguration, the first base station 110 connects to both the first MME 160 of the first MNO's core network and the second MME 180 of the second MNO's core network. As the first base station 110 is enabling a 2G service for at least users of the second MNO's network, the first base station 110 retrieves, from the second MME 180, the third tracking area code indicating that it provides a circuit switched voice service to users of the second MNO's network. The first base station 110 then broadcasts this third tracking area code.

Additionally, in a scenario where the newly-enabled 2G service of the first base station 110 may also be used by users of the first MNO's network, then the first base station 110 switches from broadcasting the second tracking area code to broadcasting the first tracking area code (indicating that it also provides a circuit switched voice service to users of the first MNO's network) in addition to broadcasting the third tracking area code.

Following these reconfigurations, any 2G and/or 4G traffic for the second MNO's users now being served by the first base station 110 is routed between the first base station 110 and the second MNO's core network.

In S109, the second base station 120 enters energy saving mode for its 2G and 4G services. As part of this reconfiguration, the second base station 120 switches from broadcasting the third tracking area code to broadcasting the fourth tracking area code (indicating that it does not provide a circuit switched voice service to users of the second MNO's network). The final state of the network is illustrated in FIG. 3.

This first embodiment ensures a User Equipment (UE) that requires a circuit switched voice service (for example, a UE that is not configured for voice services of the 4G and 5G cellular telecommunications protocols) does not connect to a base station that no longer provides a circuit switched voice service. This process is illustrated by the flow diagram of FIG. 5. When a UE that requires a circuit switched voice service, that is not connected to the second base station 120, receives the fourth tracking area code broadcast by the second base station 120, it may initiate a tracking area code update process. As part of this process, the UE sends a tracking area update request to the second MME 180, via the second base station 120, which includes the fourth tracking area code (received at the second MME 180 in S201). On receipt of the tracking area update request, in S203, the second MME 180 determines whether the UE requires a circuit switched voice service based on the capabilities of the UE. These capabilities may already be known to the second MME 180 (from an earlier capability signaling procedure) or retrieved on receipt of the tracking area update request (e.g. by retrieving its subscription status from the Home Subscriber Server (HSS)). In this example, the second MME 180 determines that the UE requires a circuit switched voice service and the process continues to S205 in which the second MME 180 determines whether or not the second base station 120 provides a circuit switched voice service to users of the second MNO's network. This is achieved, in this embodiment, by performing a lookup operation with its database of tracking area codes (which are each marked as being for base stations that either provide circuit switched voice service to users of the second MNO's network or do not provide circuit switched voice service to users of the second MNO's network) to determine whether or not the fourth tracking area code is associated with base stations that provide a circuit switched voice service to users of the second MNO's network. In this example, the second MME 180 determines from this lookup operation that the second base station 180 does not provide a circuit switched voice service to users of the second MNO's network. Accordingly, in S207, the second MME sends a tracking area update reject message to the UE. This prevents the UE from connecting to the second base station 120 when the second base station 120 does not provide a circuit switched voice service.

Furthermore, in this embodiment, the tracking area update reject message includes a cause code that causes the UE to update a list of forbidden tracking area codes with the fourth tracking area code. This will prevent the UE from connecting to any base station that transmits the fourth tracking area code without having to perform the tracking area update/reject process outlined above. This list of forbidden tracking area codes is stored in the UE until it is reset.

Following the rejected tracking area update request, the UE may connect to a base station that provides a circuit switched voice service, such as the first base station 110 that has enabled a circuit switched voice service. That is, following the above process of FIG. 5, when the UE receives the third tracking area code broadcast by the first base station 110 and sends a tracking area update request to the first base station 110, the first base station 110 forwards the tracking area update request message to the second MME 180 (using the connection established to the second MNO's core network as part of the switch to MOCN mode). The second MME 180 determines that the third tracking area code broadcast by the first base station 110 indicates that the first base station 110 does provide a circuit switched voice service to users of the second MNO's network and, in response, sends a tracking area update accept message to the UE (S209) permitting the UE to connect to the first base station 110.

The skilled person will understand that it is non-essential that the first and second base stations are operated by distinct operators. That is, in a single operator implementation of the first embodiment, the first and second base stations would transmit a first tracking area code if they provided a circuit switched voice service and a second tracking area code if they did not provide a circuit switched voice service, and a single MME would store these first and second tracking area codes in a database.

Furthermore, it is non-essential that the compensating base station enables a circuit switched voice service in order to compensate for the circuit switched voice service that is entering energy saving mode. That is, the compensating base station may already provide a circuit switched voice service (although there may be a requirement for reconfiguring this service to make it available to users of another network). This situation may arise where the energy saving base station is a femtocell and the compensating base station is a macrocell.

A second embodiment of a cellular telecommunications network 200 of the present disclosure will now be described with reference to FIG. 6. This second embodiment includes a first base station 210, a second base station 220, a core network 250, and an MME 260. The first and second base stations 210, 220 are both connected to the core network 250 and MME 260.

Figure 6:
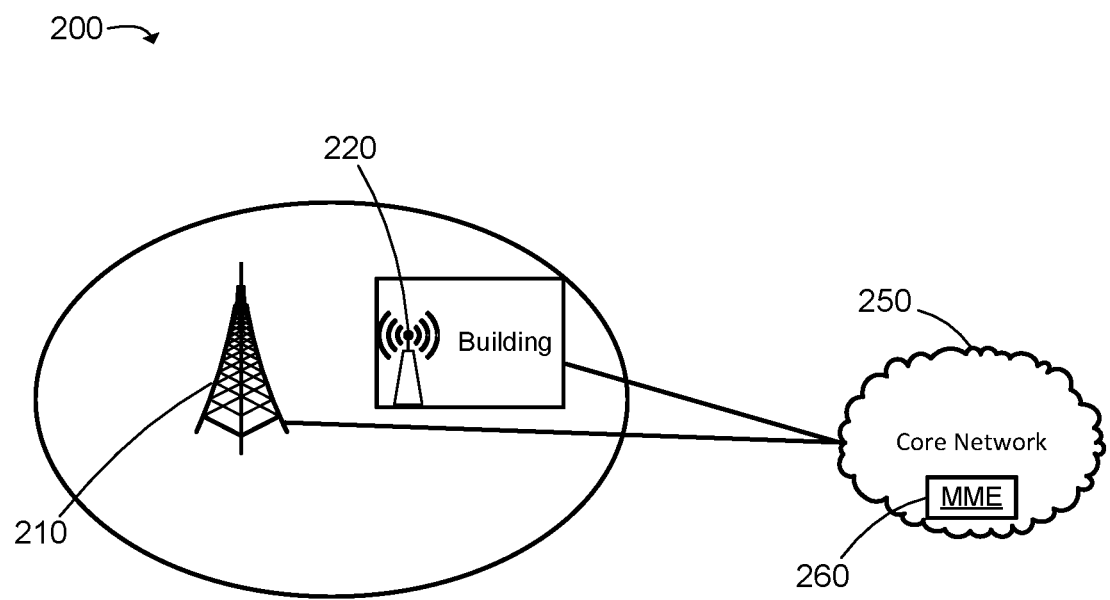
FIG. 6 is a schematic diagram of a cellular telecommunications network of a second embodiment of the present disclosure.

FIG. 6 further illustrates a building defining an interior space. The second base station 220 is positioned in the building and provides a 4G service throughout the interior space of the building. The first base station 210 is positioned outside the building and provides a circuit switched voice service according to the 2G cellular telecommunications protocol. The first base station 210 is configured to provide circuit switched voice service to the second base station's users by circuit switched fallback. In other words, the second base station 220 supports a circuit switched voice service via fallback to the first base station 210.

In this embodiment, the first base station 210 is configured to manage its load (as defined by utilization of the first base station's resources, such as radio resources or processing resources) by varying its coverage area. For example, if the first base station's load satisfies a threshold indicating that it is operating at a relatively high load, then in response the first base station 210 decreases its coverage area (by reducing its transmission power) so that users at the edge of the first base station's coverage area are encouraged to transfer to another base station. This reduces the number of served users for the first base station 210, thus reducing its load. Conversely, if the first base station's load satisfies a threshold indicating that it is operating at a relatively low load, then in response the first base station 210 increases its coverage area (by increasing its transmission power) so that more users are transferred to the first base station 210. This increases the number of served users for the first base station 210, thus increasing its load. This operation is known as "cell-breathing".

As the first base station's transmission power is variable, the coverage area of the first base station 210 may or may not cover the interior space of the building depending on whether the first base station's transmission power meets a transmission power threshold. This transmission power threshold therefore represents the minimum transmission power required for the first base station's coverage area to cover the interior space of the building. This transmission power threshold may be determined by the second base station 220, by the second base station's users and/or by operator measurements of the first base station's signal strength (e.g. Signal-to-Interference-plus-Noise Ratio (SINR)) in the interior space of the building at various transmission powers so as to determine the minimum transmission power required for a UE to receive service from the first base station 210 in the interior space. Alternatively, the threshold may be calculated using a propagation model. The transmission power threshold is stored in the second base station's memory.

In this embodiment, the second base station 220 is configured to transmit a first tracking area code if the second base station 220 supports a circuit switched voice service (that is, when the first base station's transmission power is above the transmission power threshold), and the second base station 220 is configured to transmit a second tracking area code if the second base station 220 does not support a circuit switched voice service (that is, when the transmission power of the first base station 210 is below the transmission power threshold). The MME 180 stores a database of tracking area codes in which a first set of tracking area codes are associated with base stations that support a circuit switched voice service to users in the interior space of the building and a second set of tracking area codes are associated with base stations that do not support a circuit switched voice service to the interior space of the building. In this embodiment, the first set of tracking area codes stored in the MME's database includes the first tracking area code, and the second set of tracking area codes stored in the MME's database includes the second tracking area code.

Figure 7:
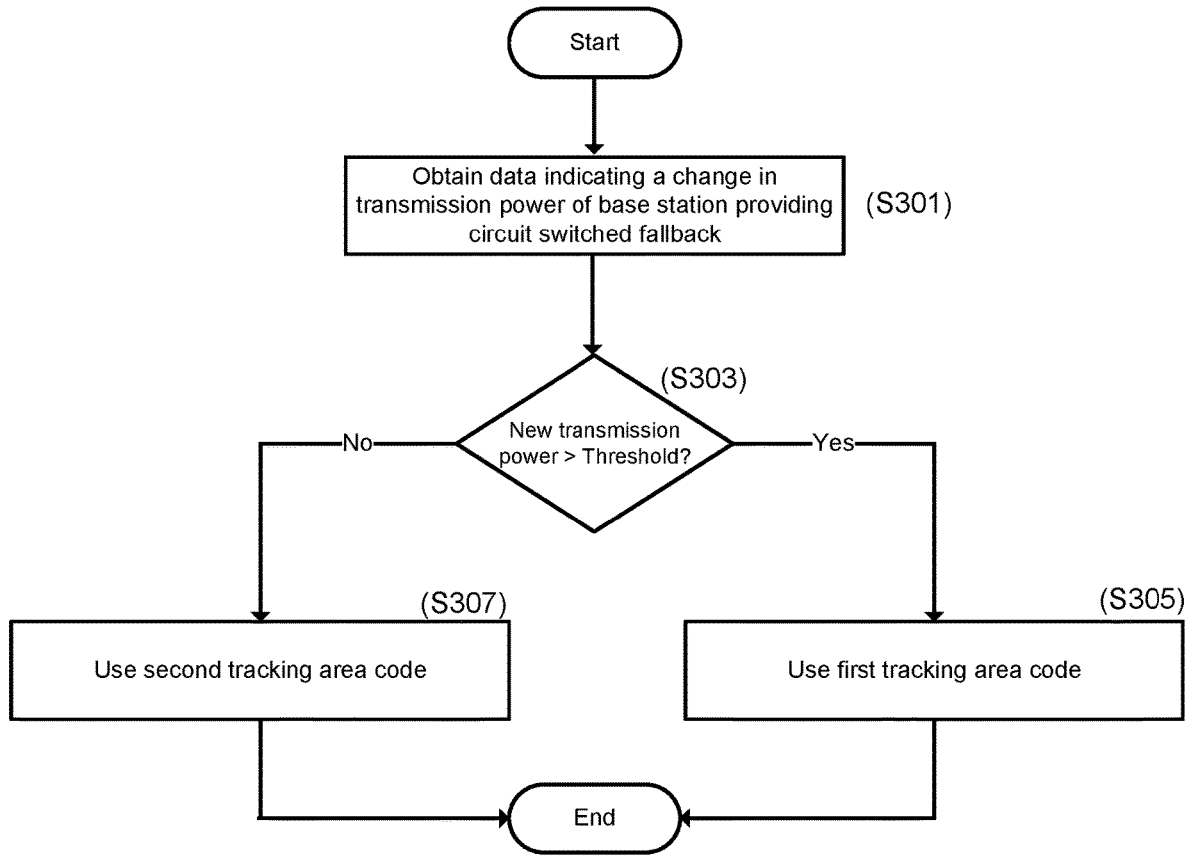
FIG. 7 is a flow diagram of a method of the second embodiment of the present disclosure.

A second embodiment of a method of the present disclosure will now be described with reference to FIG. 7. In S301 of this second embodiment, the second base station 220 obtains data indicating a change in the transmission power of the first base station 210. This data may be obtained as an update message from another network entity (e.g. the first base station 210 via X2 messaging), from measurements by the second base station 220, or from measurements by the second base station's users. This data indicates that a change has occurred and further indicates a new transmission power for the first base station 210 (either explicitly, or indicates data from which the new transmission power can be derived). In S303, the second base station 220 determines whether the new transmission power satisfies the transmission power threshold. If the new transmission power is greater than the transmission power threshold, then (in S305) the second base station 220 is configured to use the first tracking area code (indicating that it supports a circuit switched voice service to users in the interior space of the building). If the new transmission power is less than the transmission power threshold then (in S307) the second base station 210 is configured to use the second tracking area code (indicating that it does not support a circuit switched voice service to users in the interior space of the building).

Figure 5:
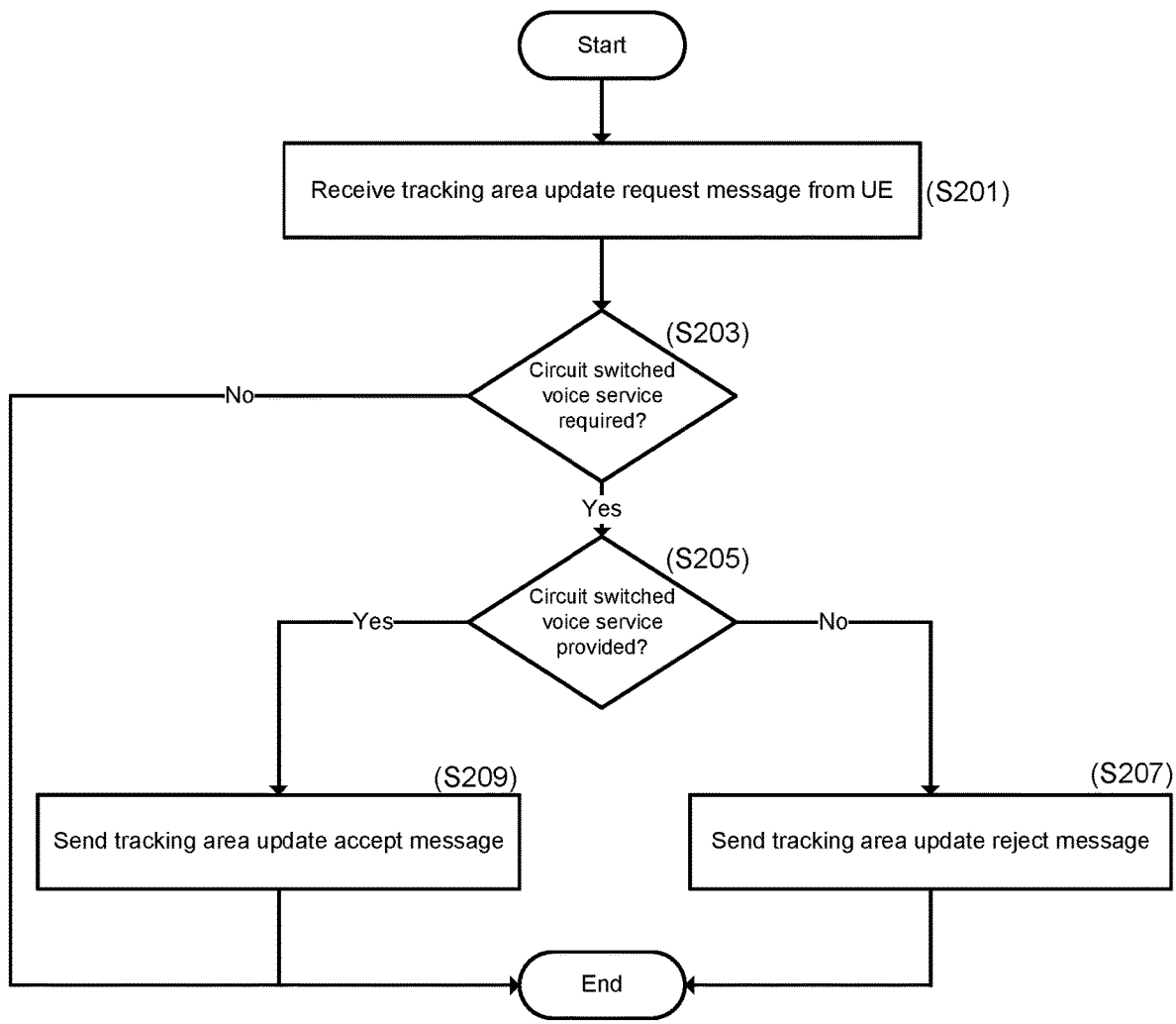
FIG. 5 is a flow diagram of a process implemented in the first, second, and third embodiments of the present disclosure.

The cellular telecommunications network of this second embodiment may then follow the process described in reference to FIG. 5 so as to ensure that UE that require a circuit switched voice service only connect to the second base station 220 if it supports a circuit switched voice service in a particular region (e.g. the interior space of the building). For example, if the first base station 210 configures its transmission power such that it does not cover the interior space of the building such that the second base station 220 transmits the second tracking area code, then a UE positioned in the interior space of the building would send a tracking area update request message to the MME on receipt of the second tracking area code transmitted by the second base station 220 within the interior space of the building. This results in a tracking area update reject message from the MME, thus ensuring that the UE would not be able to connect to the second base station 220. Conversely, if the first base station 210 configures its transmission power such that it does cover the interior space of the building such that the second base station 220 transmits the first tracking area code, then a UE positioned in the interior space of the building and requiring a circuit switched voice service would send a tracking area update request message to the MME on receipt of the first tracking area code from the second base station 220. This results in a tracking area update accept message from the MME, such that the UE would be able to connect to the second base station 220. This second embodiment therefore provides the benefit of using tracking area codes to control access based on the relative position of the UE to the base station's circuit switched voice service coverage area.

The skilled person will understand that the above second embodiment applies to other scenarios where a circuit switched voice service has a changeable coverage area. This may apply, for example, where a base station transmits both a 2G and 4G service, but varies the coverage area of the 2G service.

Figure 8:
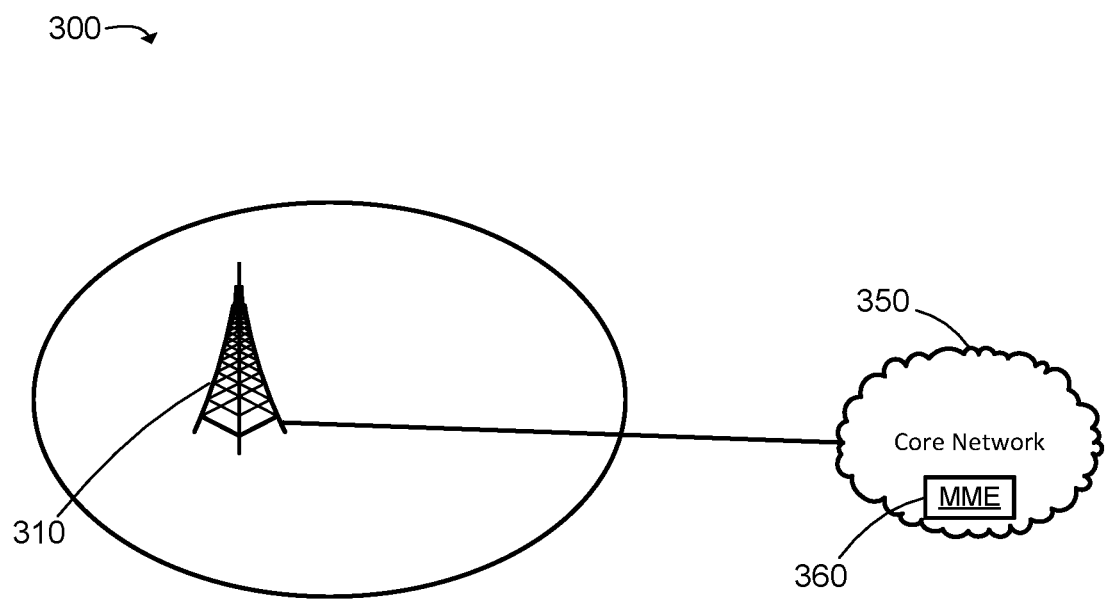
FIG. 8 is a schematic diagram of a cellular telecommunications network of the third embodiment of the present disclosure.

A third embodiment of a cellular telecommunications network 300 will now be described with reference to FIG. 8. This third embodiment includes a first base station 310, a core network 350, and an MME 360. The first base station 310 is connected to the first core network 350 and first MME 360.

In this third embodiment, the first base station 310 is configured for communications according to a plurality of protocols, in which at least one of these protocols includes circuit switched voice service. In this example, the first base station 310 is configured to provide both a 2G service and a 4G service. The first base station 310 is also configured to reassign spectrum between the 2G and 4G services, such that some or all of the 2G spectrum may be reassigned for use by the 4G service (and vice-versa).

The first base station 310 is further configured to transmit a tracking area code. In this embodiment, the first base station 310 is configured to transmit a first tracking area code if the first base station provides a circuit switched voice service (that is, at least some of the 2G spectrum is still being used for a 2G service) and to transmit a second tracking area code if it does not provide a circuit switched voice service (that is, all of the 2G spectrum has been reassigned to the 4G service). The MME 360 stores a database of tracking area codes in which a first set of tracking area codes are associated with base stations that provide a circuit switched voice service and a second set of tracking area codes are associated with base stations that do not provide a circuit switched voice service. In this embodiment, the first set of tracking area codes stored in the MME's database includes the first tracking area code, and the second set of tracking area codes stored in the MME's database includes the second tracking area code.

Figure 9:
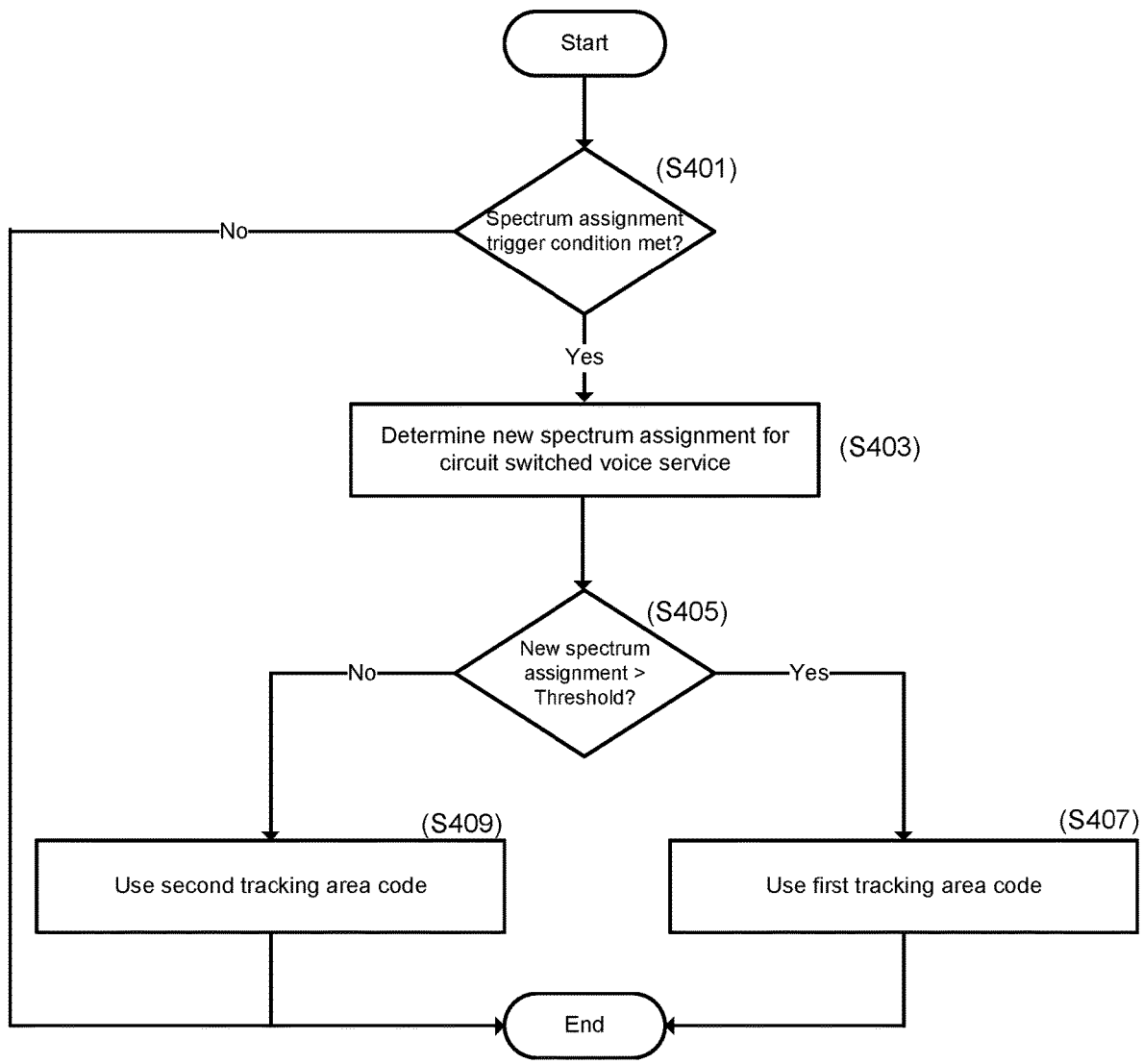
FIG. 9 is a flow diagram of a method of the third embodiment of the present disclosure.

A third embodiment of a method of the present disclosure will now be described with reference to FIG. 9. In S401 of this third embodiment, it is determined that a trigger condition has been satisfied for the first base station 310 to change its spectrum assignment of its circuit switched voice service. In S403, the first base station 310 determines its new spectrum assignment for its circuit switched voice service. In S405, the third base station 300 determines whether the new spectrum assignment is greater than a spectrum assignment threshold required to provide the 2G service. This threshold may be 0 Hz. If this determination is positive, then, in S407, the first base station 310 transmits the first tracking area code. If this determination is negative, then, in S409, the first base station 310 transmits the second tracking area code.

The cellular telecommunications network of this third embodiment may then follow the process described in reference to FIG. 5 so as to ensure that UE that require a circuit switched voice service only connect to the first base station 310 if it provides its circuit switched voice service. For example, if the first base station 310 has no spectrum assigned to its 2G service (that is, it has reassigned all 2G spectrum to its 4G service) and therefore transmits the second tracking area code, then a UE would send a tracking area update request message to the MME on receipt of the second tracking area code. If the UE requires a circuit switched voice service, then the MME would reject this tracking area update message, thus ensuring that the UE would not be able to connect to the first base station 310. Conversely, if the first base station 310 has a non-zero spectrum assignment for its 2G service and therefore transmits the first tracking area code, then a UE would send a tracking area update request message to the MME on receipt of the first tracking area code. If the UE required a circuit switched voice service, then the MME would accept this tracking area update message and the UE would be able to connect to the first base station 310. This third embodiment therefore provides the benefit of using tracking area codes to control access based on a current spectrum assignment to a circuit switched voice service when the base station implements spectrum refarming.

In the above embodiments, the circuit switched voice service is a GSM 2G service. However, this is non-essential and the skilled person would understand that the above embodiments may apply to a circuit switched voice service of any protocol, such as the 3G voice service (as standardized by 3GPP).

In the embodiments above, the tracking area codes transmitted by each base station indicate whether that base station either provides or does not provide a circuit switched voice service. However, the tracking area codes may more generally indicate whether that base station either supports or does not support a circuit switched voice service. That is, a base station may support a circuit switched voice service if it either provides a circuit switched voice service itself, or it does not provide a circuit switched voice service but facilitates fallback to a circuit switched voice service. Conversely, a base station may not support a circuit switched voice service if it does not provide a circuit switched voice service and it does not facilitate fallback to a circuit switched voice service. For example, in a modification to the first embodiment, following the reconfigurations of the first and second base stations (such that the first base station 100 enables a 2G service and the second base station 200 enters energy saving mode for its 2G service), the second base station 200 may still support circuit switched voice service to users of the second MNO's network if it facilitates circuit switched fallback to the first base station's newly enabled 2G service. In such a scenario, the second base station 200 may also broadcast the third tracking area code so that users (requiring circuit switched voice service) are permitted to connect to the second base station 200.

In the above embodiments, the MME stored a first set of tracking area codes identifying base stations that support or provide a circuit switched voice service and a second set of tracking area codes identifying base stations that do not support or provide a circuit switched voice service. This is non-essential and the skilled person will understand that other implementations are possible. For example, the MME may store a single list of tracking area codes which identify base stations that support or provide a circuit switched voice service, and the MME would then only permit access to a base station if the tracking area update request included a tracking area code on that list. In another example, the MME may store a single list of tracking area codes which identify base stations that do not support or provide a circuit switched voice service, and the MME would then only permit access to a base station if the tracking area update request included a tracking area code that is not on that list.

The skilled person will understand that any combination of features is possible within the scope of the disclosure, as claimed.

The invention claimed is:

1. A method of operating a management node in a cellular telecommunications network, the cellular telecommunications network including a first base station and a User Equipment (UE), the management node storing a first set of tracking area codes, wherein the first base station is configured to transmit a first tracking area code and the UE is configured to send a tracking area update request message to the first base station identifying the first tracking area code, the method comprising:
   receiving a request message from the first base station, the request message including the first tracking area code identified in the tracking area update request message;
   comparing the received first tracking area code to the first set of tracking area codes; and
   sending a response message to the first base station, the response message accepting or rejecting a tracking area request based on the comparison,
   wherein:
      when each of the first set of tracking area codes is associated with a base station that supports a circuit switched voice service, the accepting or the rejecting of the tracking area request includes accepting the tracking area request if the received first tracking area code is one of the first set of tracking area codes, and when each of the first set of tracking area codes is associated with a base station that does not support the circuit switched voice service, the accepting or the rejecting of the tracking area request includes rejecting the tracking area request if the received first tracking area code is one of the first set of tracking area codes.

2. The method as claimed in claim 1, wherein the first set of tracking area codes is associated with the base station that supports the circuit switched voice service, the management node stores a second set of tracking area codes and each of the second set of tracking area codes is associated with the base station that does not support a circuit switched voice service, and the accepting or the rejecting of the tracking area request includes rejecting the tracking area request if the received first tracking area code is one of the second set of tracking area codes.

3. The method as claimed in claim 1, wherein the response message identifies the first tracking area code as forbidden.

4. A non-transitory computer-readable storage medium storing a computer program comprising instructions which, when the computer program is executed by a computer, cause the computer to operate a management node in a cellular telecommunications network, the cellular telecommunications network including a first base station and a User Equipment (UE), the management node storing a first set of tracking area codes, wherein the first base station is configured to transmit a first tracking area code and the UE is configured to send a tracking area update request message to the first base station identifying the first tracking area code, wherein the computer operates the management node to:
   receive a request message from the first base station, the request message including the first tracking area code identified in the tracking area update request message;
   compare the received first tracking area code to the first set of tracking area codes; and
   send a response message to the first base station, the response message accepting or rejecting a tracking area request based on the comparison,
   wherein:
      when each of the first set of tracking area codes is associated with a base station that supports a circuit switched voice service, the accepting or the rejecting of the tracking area request includes accepting the tracking area request if the received first tracking area code is one of the first set of tracking area codes, and
      when each of the first set of tracking area codes is associated with a base station that does not support the circuit switched voice service, the accepting or the rejecting of the tracking area request includes rejecting the tracking area request if the received first tracking area code is one of the first set of tracking area codes.

5. A management node for a cellular telecommunications network having a processor configured to operate the management node in the cellular telecommunications network, the cellular telecommunications network including a first base station and a User Equipment (UE), the management node storing a first set of tracking area codes, wherein the first base station is configured to transmit a first tracking area code and the UE is configured to send a tracking area update request message to the first base station identifying the first tracking area code, wherein the processor operates the management node to:
   receive a request message from the first base station, the request message including the first tracking area code identified in the tracking area update request message;
   compare the received first tracking area code to the first set of tracking area codes; and
   send a response message to the first base station, the response message accepting or rejecting a tracking area request based on the comparison,
   wherein:
   when each of the first set of tracking area codes is associated with a base station that supports a circuit switched voice service, the accepting or the rejecting of the tracking area request includes accepting the tracking area request if the received first tracking area code is one of the first set of tracking area codes, and
   when each of the first set of tracking area codes is associated with a base station that does not support the circuit switched voice service, the accepting or the rejecting of the tracking area request includes rejecting the tracking area request if the received first tracking area code is one of the first set of tracking area codes.

* * * * *